(12) United States Patent
Mazeaud

(10) Patent No.: US 10,845,315 B2
(45) Date of Patent: Nov. 24, 2020

(54) CONTROL INTERFACE FOR A MACHINE-VISION LIGHTING DEVICE

(71) Applicant: TPL VISION UK LTD, Charing Kent (GB)

(72) Inventor: Guillaume Mazeaud, Glencarse (GB)

(73) Assignee: TPL VISION UK LTD, Charing Kent (GB)

( * ) Notice: Subject to any disclaimer, the term of this patent is extended or adjusted under 35 U.S.C. 154(b) by 0 days.

(21) Appl. No.: 16/338,114

(22) PCT Filed: Sep. 26, 2017

(86) PCT No.: PCT/EP2017/074423
§ 371 (c)(1),
(2) Date: Mar. 29, 2019

(87) PCT Pub. No.: WO2018/065265
PCT Pub. Date: Apr. 12, 2018

(65) Prior Publication Data
US 2020/0025687 A1 Jan. 23, 2020

(30) Foreign Application Priority Data
Oct. 3, 2016 (FR) ..................................... 16 59504

(51) Int. Cl.
*G01N 21/88* (2006.01)
*H05B 45/00* (2020.01)
(Continued)

(52) U.S. Cl.
CPC ......... *G01N 21/8806* (2013.01); *G03B 15/05* (2013.01); *H04N 5/2354* (2013.01);
(Continued)

(58) Field of Classification Search
CPC ....... G01N 21/8806; G01N 2021/8838; G01N 2201/063; H05B 45/00; H05B 45/22;
(Continued)

(56) References Cited

U.S. PATENT DOCUMENTS 5,500,732 A 3/1996 Ebel et al.
6,061,522 A 5/2000 Inoue et al.
(Continued)

FOREIGN PATENT DOCUMENTS

WO 2015128760 A1 9/2015

OTHER PUBLICATIONS

International Search Report corresponding International application PCT/EP2017/074423 dated Nov. 8, 2017, 4 pages.

*Primary Examiner* — Joseph L Williams
*Assistant Examiner* — Jose M Diaz
(74) *Attorney, Agent, or Firm* — Cooper Legal Group, LLC; Ronald M. Kachmarik

(57) ABSTRACT

A machine-vision device including a camera system, with a camera and an integrated origin light source that is integrated into the camera system, and a lighting device with: control interface including: a plurality of light sensors each for capturing a respective origin light signal, and emitting a respective sensor signal, and an electronic unit for processing the sensor signal configured so as to transmit a respective control signal to a respective output of the processing electronic unit. The lighting device with one or more automatically controlled light sources that are external to the camera system, each connected to one respective output of the processing electronic unit by respective connection, so as to be controlled with the control signal delivered to the output. At least one light sensor is placed so as to directly capture the light emitted by one origin light source.

21 Claims, 5 Drawing Sheets

(51) Int. Cl.
　　　*G03B 15/05*　　　　(2006.01)
　　　*H04N 5/232*　　　　(2006.01)
　　　*H04N 5/235*　　　　(2006.01)

(52) U.S. Cl.
　　　CPC ......... *H04N 5/23206* (2013.01); *H05B 45/00* (2020.01); *G01N 2201/063* (2013.01); *G03B 2215/0557* (2013.01)

(58) Field of Classification Search
　　　CPC .............................. H05B 47/14; G03B 15/05; G03B 2215/0557; G03B 2215/0567; G03B 2215/0521; G03B 2215/0575; G03B 15/0426; H04N 5/23206; H04N 5/2256; H04N 5/2354; H04N 2201/063; G01B 11/24
　　　See application file for complete search history.

(56) References Cited

U.S. PATENT DOCUMENTS

| | | |
|---|---|---|
| 6,788,411 B1 | 9/2004 | Lebens |
| 2004/0151487 A1 | 8/2004 | Iwasaki et al. |
| 2010/0110682 A1 | 5/2010 | Jung et al. |
| 2014/0340573 A1 | 11/2014 | Clawson |
| 2018/0075409 A1* | 3/2018 | Kreger ............... G06Q 10/0838 |

\* cited by examiner

CONTROL INTERFACE FOR A MACHINE-VISION LIGHTING DEVICE

TECHNICAL FIELD

The present invention relates to a control interface for a machine-vision lighting device, to a machine-vision lighting device, to a machine-vision device and to a device for conveying items including such an interface. According to another aspect, the invention relates to a method for controlling a machine-vision lighting device.

PRIOR ART

In the industrial field it is known to inspect items, in particular items conveyed on a conveyor line, with respect to defects, dimensions and/or color, or indeed to read codes present on these items. This inspection is advantageously carried out automatically in order to be objective and repeatable. To do this, a machine-vision device is employed, for example with a view to sorting the items depending on the inspection carried out. For example, a mechanical arm may be used to remove, from a conveyor line, items considered to be defective. The machine-vision device includes light sources that illuminate a zone of interest through which the items to be sorted pass, and a camera for taking images of the light reflected by the zone of interest through which the items pass. The images are then processed by an electronic unit, for example a computer, and the arm is controlled depending on the result of this image processing.

The quality of the contrast, and therefore the robustness of these inspections, depends on the lighting method. The lighting may for example be directional, diffuse and indirect, coaxial, with a grazing incidence with respect to the axis of the camera, or even produce a silhouette. Likewise, there may be cause to light red parts on a blue belt in the red, the parts thus appearing white on a black background in the eyes of a monochrome camera.

Lastly, conventionally, the light sources do not provide illumination continuously, but do so intermittently, in the manner of a stroboscope. The light sources thus emit successive flashes of a duration equal to or slightly longer than the exposure time of the camera of the machine-vision device. This allows the moving items on the conveyor belt to be "frozen" for the image capture using the camera. This furthermore allows the potential lifetime of the light sources to be increased, in particular when they are light-emitting diodes (LEDs).

The turn-on and turn-off of the light sources is generally achieved using all-or-nothing (AON) outputs of the camera or a programmable logic controller (PLC), or even via field buses for lights equipped with an ad hoc interface, such as an ethernet, RS485, RS232, DeviceNet or Profibus interface, inter alia. These interfaces are however rare because of the high cost and complexity of the associated programming, in particular when a plurality of light sources must be controlled in coordinated sequences to emit different colors and/or different light intensities. Field buses are then the only possible solutions. They however have a limited reactivity that may degrade the precision of the specified turn-on sequences. Moreover, camera systems comprising integrated LED lighting do exist.

However, this integrated lighting allows only directional and monochromatic lighting to be produced, this limiting the ability to define a lighting method that is optimal for a given situation.

There is therefore a need for a lighting device for machine vision that does not have the aforementioned drawbacks, and that in particular allows complicated cabling, network connections and interface programs to be avoided while allowing the lighting method to be defined with great flexibility.

SUMMARY OF THE INVENTION

In response to this need, the invention provides a control interface for a machine-vision lighting device, comprising:
  a plurality of light sensors each for capturing a respective origin light signal, and emitting a respective sensor signal in response to the capture of said respective origin light signal;
  an electronic unit for processing said respective sensor signal, configured so as to transmit, as a consequence of said processing, a respective control signal to at least one respective output of the processing electronic unit.

After connection of one, and preferably more than one, output(s) of the processing electronic unit to one, and preferably more than one, respective automatically controlled light source(s), the respective control signals thus allow the one or more automatically controlled light sources to be controlled.

Thus, the interface according to the invention allows external lighting to be controlled using origin light signals emitted, for example, by light sources included in the camera system, in particular when these light sources are not able to guarantee an acceptable contrast for the processing of the image. This interface is simple to produce and has a small bulk.

According to preferred embodiments, the interface according to the invention has one or more of the following features, which may be implemented alone or in combination:
  the light sensors are configured to detect only a light spectrum of a width smaller than 100 nm and preferably smaller than 50 nm, preferably substantially centered (+/−20 nm) on a discrete wavelength chosen from 470 nm, 525 nm, 635 nm, 660 nm, 850 nm, and 880 nm;
  the electronic unit is configured so as to identify an automatically controlled light source and so as to generate a control signal for said automatically controlled light source depending on a light intensity and/or a color to be emitted by said automatically controlled light source; thus, the control signal sets a light intensity and/or a color of the automatically controlled light source identified by the electronic unit, and controls the lighting provided by this automatically controlled light source, depending on the processing of the received sensor signals;
  the electronic unit is configured so that the magnitude of said control signal is proportional, and preferably substantially equal, to the intensity of an origin light signal;
  the electronic unit is configured so as to define the control signals intended to drive the automatically controlled light sources depending on:
    the timing of the sensor signals, in particular depending on the sequence of turn-on of the origin light sources, and/or
    the origin of the sensor signals, and in particular depending on the position of the light sensors that generated said sensor signals, and/or
    the color of the origin light signals;

the origin light signal received by a light sensor, preferably by each light sensor, is preferably output by one or more origin light sources that are integrated into a camera system;

the one or more automatically controlled light sources are external to said camera system, i.e. not integrated into the camera, and, in particular, are not rigidly fastened to the camera;

the origin light sources are light-emitting diodes;

the light sensors are distributed over a sensor holder (which is preferably of rectangular general shape) having an aperture preferably placed in the center of the sensor holder;

the sensor holder has:
  a length larger than 50 mm and/or smaller than 90 mm and preferably equal to 70 mm; and/or
  a width larger than 30 mm and/or smaller than 60 mm, and preferably equal to 45 mm; and/or
  an aperture, which is preferably circular, of radius larger than 12 mm and/or smaller than 30 mm;

the light sensors are fastened to the sensor holder with a density of at least one light sensor per 9 mm$^2$ and/or of at most one light sensor per mm$^2$.

the processing electronic unit is an integrated circuit, in particular a programmable logic circuit and preferably a programmable gate array.

According to another aspect, the invention relates to a lighting device for machine vision, comprising:
  a control interface according to the invention, and
  one or more automatically controlled light sources, each connected to one respective output of the processing electronic unit by respective connecting means, so as to be controlled with the control signal delivered to said output.

According to preferred embodiments, the lighting device according to the invention has one or more of the following features, which may be implemented alone or in combination:

the one or more automatically controlled light sources are each a light-emitting diode or a group of light-emitting diodes;

the automatically controlled light sources are fastened to one or more automatically-controlled-light-source holders, the automatically-controlled-light-source holder(s) preferably being of planar general shape, and in particular of rectangular or hemispherical shape;

the automatically controlled light sources are fastened to a single automatically-controlled-light-source holder that is equipped with an aperture, the automatically-controlled-light-source-holder aperture preferably being placed at the center of said holder;

the automatically controlled light sources are fastened to an automatically-controlled-light-source holder that is equipped with an automatically-controlled-light-source-holder aperture, and the light sensors are fastened to a sensor holder having a sensor-holder aperture that is coaxial with said automatically-controlled-light-source-holder aperture;

the one or more automatically controlled light sources and/or the one or more origin light sources are configured to operate intermittently, and preferably to emit flashes of a duration shorter than 10 ms, preferably shorter than 3 ms and preferentially shorter than 200 µs and/or a light spectrum of a width smaller than 100 nm and preferably smaller than 50 nm.

The invention also relates to a machine-vision device comprising:

a camera system comprising a camera and at least one origin light source that preferably emits intermittently; and a lighting device according to the invention including at least one light sensor placed so as to directly capture the light emitted by said origin light source.

In one embodiment, said light sensor is placed so as to directly capture the light emitted by more than one, or even all of the origin light sources.

In one embodiment, each light sensor is placed so as to directly capture the light emitted by a single respective origin light source or by a single group of origin light sources that emit synchronously.

In one embodiment, the lighting device includes a mask that is configured to reflect and/or absorb more than 50%, preferably more than 70%, preferably more than 80%, preferably more than 90% and even more preferably substantially 100% of the light intensity of the origin light signals emitted by the one or more origin light sources, which are preferably integrated into the camera.

Preferably, the mask bears the light sensors. The mask may consist of the sensor holder. Thus, preferably, the one or more origin signals are not projected onto the scene observed by the objective of the camera and are substantially used only to irradiate the mask and the light sensors.

Again preferably, the light sensors are placed, and in particular isolated by the mask, so that the light that they receive originates, with respect to more than 50%, preferably more than 70%, preferably more than 90%, and preferably substantially 100% of the intensity thereof, from the one or more origin light sources, which are preferably integrated into the camera. Advantageously, the light captured by the light sensors is substantially not influenced by the exterior environment of the camera system. The inspection of the quality of the light emitted by the one or more automatically controlled light sources is thereby improved.

In one preferred embodiment, the mask physically isolates, from the scene observed by the objective of the camera, the camera and said at least one origin light source, with the exception of the objective of said camera, which preferably lies facing an aperture in the mask, or even extends through said aperture.

Thus, the camera observes a scene illuminated by the one or more automatically controlled light sources and substantially not illuminated by the one or more origin light sources.

Preferably, less than 50%, less than 30%, and preferably less than 10% of the intensity of the light emitted by the one or more automatically controlled light sources illuminates the camera system.

In one preferred embodiment, the mask therefore isolates not only the one or more origin light sources from the scene observed by the objective of the camera, but also isolates the one or more light sensors from the automatically controlled light sources.

The automatic control of the automatically controlled light sources therefore substantially depends only on the light emitted by the one or more origin light sources. In particular, it substantially does not depend on the light emitted by the one or more automatically controlled light sources.

Preferably, the camera is removably fastened to a camera holder, which is preferably rigidly fastened to the sensor holder. The camera holder is preferably provided with manually deactivatable means for attaching the camera.

Preferably, the one or more origin light sources are fastened, preferably rigidly and non-removably, to the camera. In particular, the one or more origin light sources preferably consist of a flash or any other lighting means conventionally integrated into a camera.

The invention also relates to a device for conveying items, comprising at least:
- an item-conveying track, and
- a machine-vision device according to the invention, the automatically controlled light sources being suitable for illuminating at least one segment of the item-conveying track.

In one embodiment, the conveying device furthermore comprises a sorting unit controlled by an electronic control module that is connected to a digitizing device of the machine-vision device, in order to sort the items conveyed on the conveying track depending on images captured by the optical sensor of the camera system.

According to another aspect, the invention relates to a method for controlling lighting for a machine-vision device, comprising the steps of:
i) emitting origin light signals;
ii) capturing the emitted origin light signals;
iii) processing the captured origin light signals in order to deduce therefrom the way in which to control one or more automatically controlled light sources;
iv) controlling one or more automatically controlled light sources in the way deduced in step iii).

According to preferred embodiments, the method has one or more of the following features, which may be implemented alone or in combination:
- step iii) consists in converting bits of the emitted origin light signals into control parameters of an automatically controlled light source, the parameters preferably comprising an identification of the automatically controlled light source and/or an intensity for the light to be emitted by the automatically controlled light source and/or a color for said light;
- the control method is implemented by means of a control interface according to the invention, in a lighting device according to the invention, in a machine-vision device according to the invention or in a conveying device according to the invention.

BRIEF DESCRIPTION OF THE FIGURES

Other features and advantages of the invention will become apparent on reading the following detailed description, which description makes reference to the appended drawings, in which.

In the present description, elements that are identical or that perform identical functions have been given the same reference signs. For the sake of conciseness of the description, these elements are not described for each figure.

DETAILED DESCRIPTION

Figure 1:
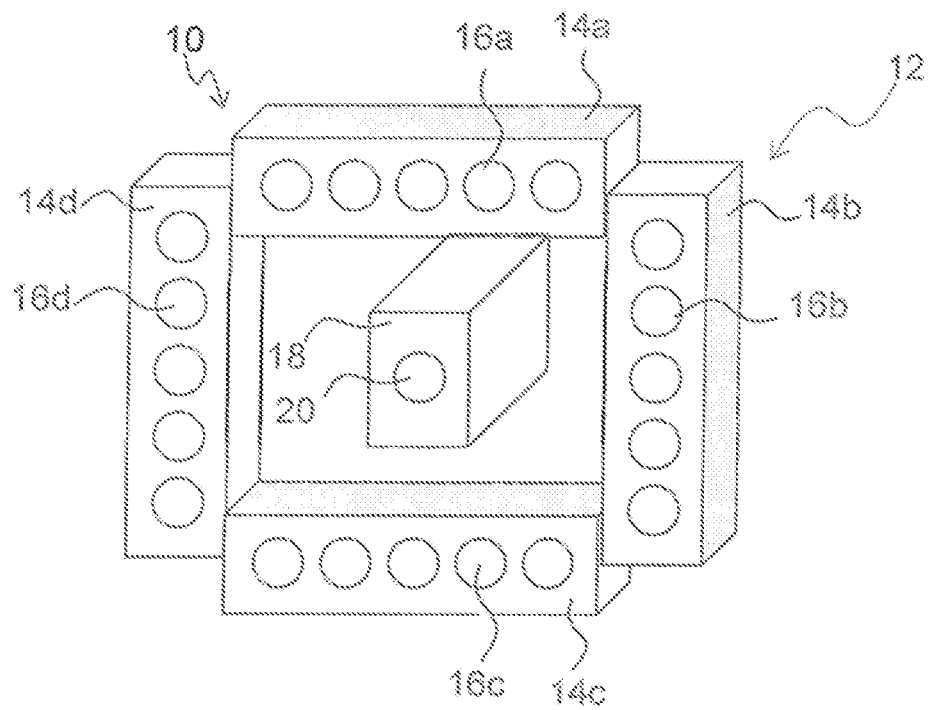
FIG. 1 schematically shows a machine-vision device.

FIG. 1 shows an example of a machine-vision device 10. This device 10 comprises a lighting device 12, for illuminating a zone of interest, for example a segment of a conveyor belt. The lighting device 12 here comprises four automatically-controlled-light-source holders 14 (14a-14d) to each of which five respective automatically controlled light sources 16 (16a-16d), in the present case LEDs or groups of LEDs that operate synchronously, are fastened.

The machine-vision device 10 also comprises a camera system 18 that is independent of the lighting device 12, in order to capture an image of the zone of interest illuminated by the lighting device 12. The camera system is for example connected to a unit for processing the images captured by the camera, in order to identify items located in the illuminated zone of interest and to detect items that do not meet a defined criterion.

Figure 2:
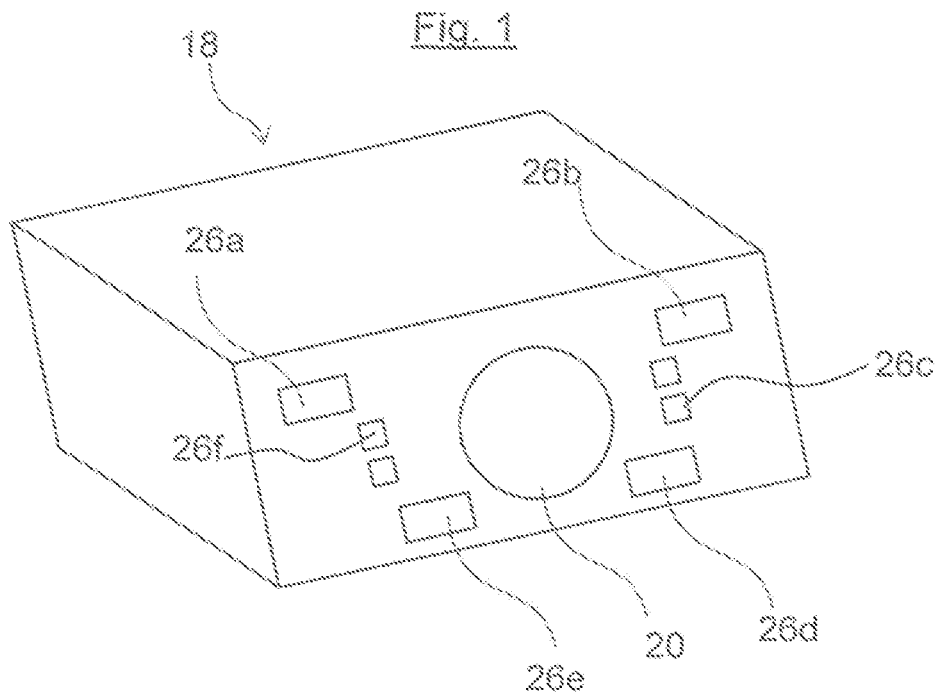
FIG. 2 illustrates a camera system able to be implemented in the machine-vision device of FIG. 1.
Figure 4:
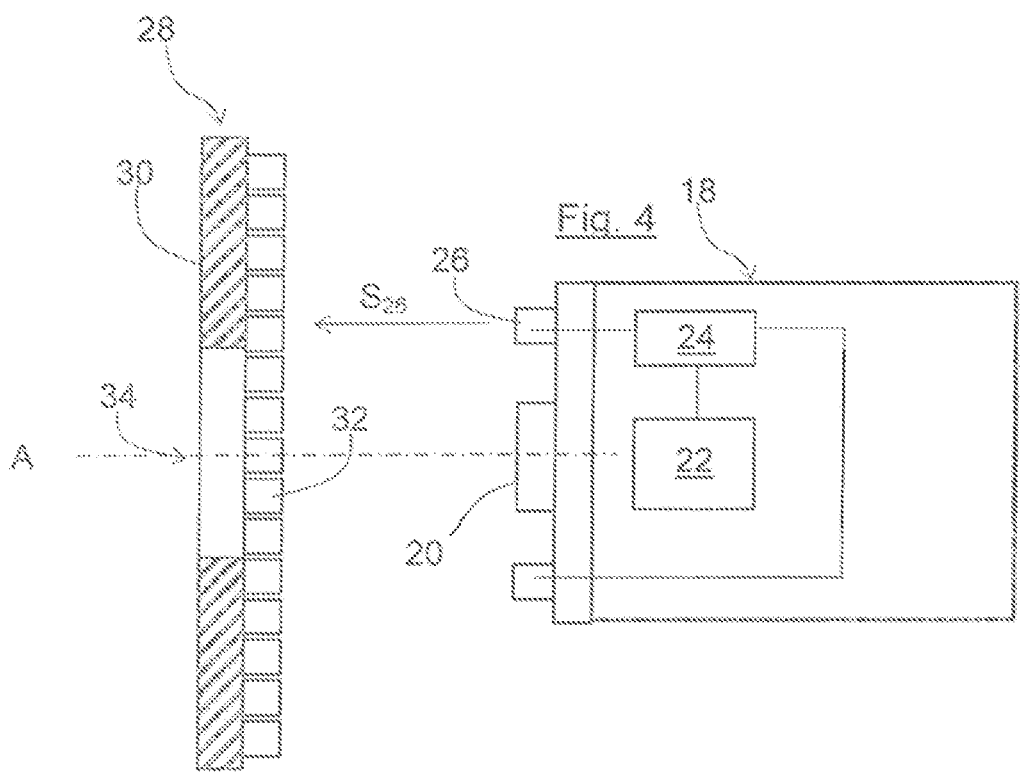
FIG. 4 illustrates a camera system and a control interface able to be implemented in the machine-vision device of FIG. 1.

The camera system 18, which is shown in more detail in FIGS. 2 and 4, comprises an objective 20 that is composed of an optical lens or of a plurality of optical lenses, which objective is associated with an optical sensor 22 for capturing the image of the zone of interest illuminated by the automatically controlled light sources 16. The optical sensor 22 is connected to an electronic board 24, in particular in order to process information originating from the optical sensor 22 and to deduce therefrom a digitized image of the zone of interest.

The camera system 18 further comprises a plurality of origin light sources 26, which are controlled by the electronic board 24. These origin light sources 26 may be of different colors and/or oriented in different emission directions. Often, the origin light sources 26 do not allow satisfactory illumination of the zone of interest to be achieved, i.e. an illumination that allows the machine-vision device 10 to identify and, for example, to sort the items present in the zone of interest.

Figure 3:
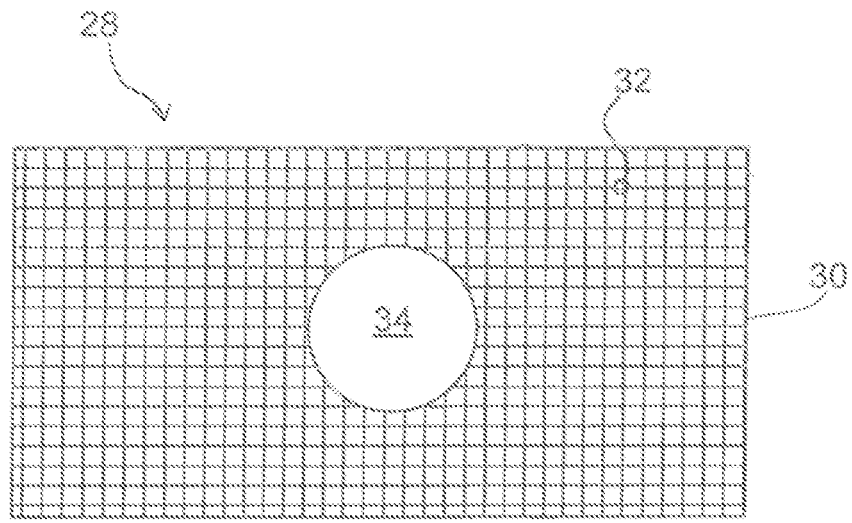
FIG. 3 schematically shows a control interface for a lighting device able to be controlled using the camera system of FIG. 2.

For this reason, the machine-vision device 10 further includes an interface 28 for controlling the lighting device 12, which interface is shown in more detail in FIGS. 3 and 4. This interface 28 is here formed from a sensor holder 30 to one face of which light sensors 32 are fastened. The sensor holder 30 is here planar, of substantially rectangular shape, and has a circular aperture 34 in its center. The circular aperture 34 allows the camera system 18 to capture images of the zone of interest illuminated by the lighting device 22, through the sensor holder 30. The dimensions of the holder 30 are for example:
- a length larger than 50 mm and/or smaller than 90 mm, and preferably equal to 70 mm 70 mm;
- a width larger than 30 mm and/or smaller than 60 mm, and preferably equal to 45 mm.

The circular aperture 34 is for example of radius larger than 12 mm and/or smaller than 30 mm. The interface is for example placed at a distance smaller than 50 mm from the camera system 18, for example at a distance of 20 mm.

The light sensors 32, which are preferably oriented toward the origin light sources 26, are here uniformly distributed. The density of light sensors may in particular be higher than one sensor per 9 mm² and/or lower than one light sensor per mm². It may preferably have a relatively low density of light sensors so that the light emitted by one origin light source 26 is captured substantially only by one light sensor 32. Specifically, this allows, as will be seen below, the automatically controlled light sources 16 that illuminate the zone of interest to be controlled independently. However, the higher the number of light sensors 32, the greater the number and complexity of possible controls. In one embodiment, light sensors 32 are provided only facing origin light sources 26, in an amount of, for example, one light sensor 32 per origin light source 26.

The light sensors 32 are for example of square shape, and of 1 mm side length.

Figure 5:
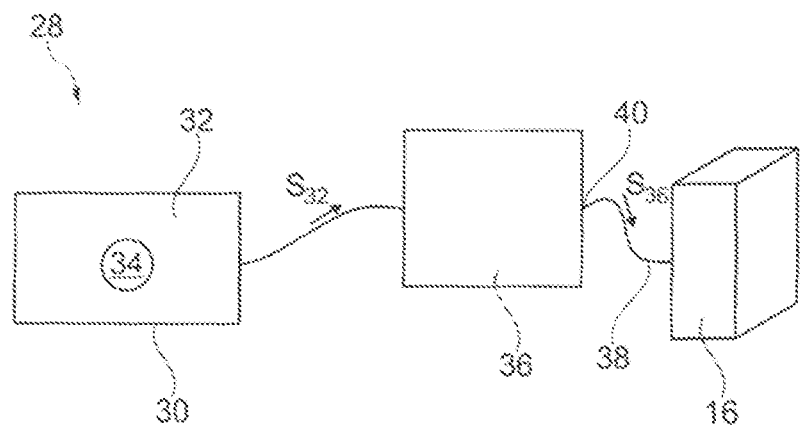
FIG. 5 illustrates the control of LEDs using the control interface of FIG. 3.

As schematically illustrated by FIG. 5, the light sensors 32 are connected to an electronic unit 36 32. The processing electronic unit 36 processes the signals S32 delivered as output by the light sensors 32 and converts them into control signals $S_{36}$ for the automatically controlled light sources 16 of the lighting device 12. To do this, the interface 28 includes means 38 for connecting outputs 40 of the processing electronic unit 36 to one or more automatically controlled light sources 16 of the lighting device 12, allowing said automatically controlled light sources 16 to be controlled depending on the origin light signals $S_{26}$ emitted by the origin light sources 26 of the camera system. The origin light signals may thus indirectly control the automatically controlled light sources 16 of the lighting device 12.

Preferably, the electronic unit 36 determines, depending on the signals S32 received from the light sensors, the identification of one or more automatically controlled light sources 16 to be controlled and, for each of these automatically controlled light sources 16, a light intensity and/or a color for the light to be produced.

Preferably, the automatically controlled light sources 16 are controlled to emit intermittently, and preferably to emit flashes of a duration shorter than 10 ms, preferably shorter than 3 ms and preferentially shorter than 200 μs. Advantageously, intermittent illumination avoids the creation of blur in the images during the movement of the parts.

With each output 40 is associated one automatically controlled light source, preferably one or more LEDs, and one control signal for said automatically controlled light source.

The outputs 40 may be single electrical terminals, and the connecting means 38 may be electrical cables. Preferably, the electronic unit 36 delivers, to each output, a supply current for one automatically controlled light source 16 of the lighting device 12.

Advantageously, the processing electronic unit 36 is divided into modules, in particular independent modules, which each control, preferably depending on a respective light emission received from a respective origin light source 26, a respective automatically controlled light source 16 (in particular an LED or a group of LEDs) of the lighting device 12, independently. Thus, for example, one light sensor 32, or a group of light sensors 32, may be functionally connected to such an independent module, in order to control one LED or one group of LEDs of the lighting device 12. Each module may advantageously consist of a field programmable gate array (FPGA), which ensures a reduced processing time.

Preferably, the processing electronic unit includes more than 3, more than 7, more than 15, or more than 127 outputs 40.

Figure 6:
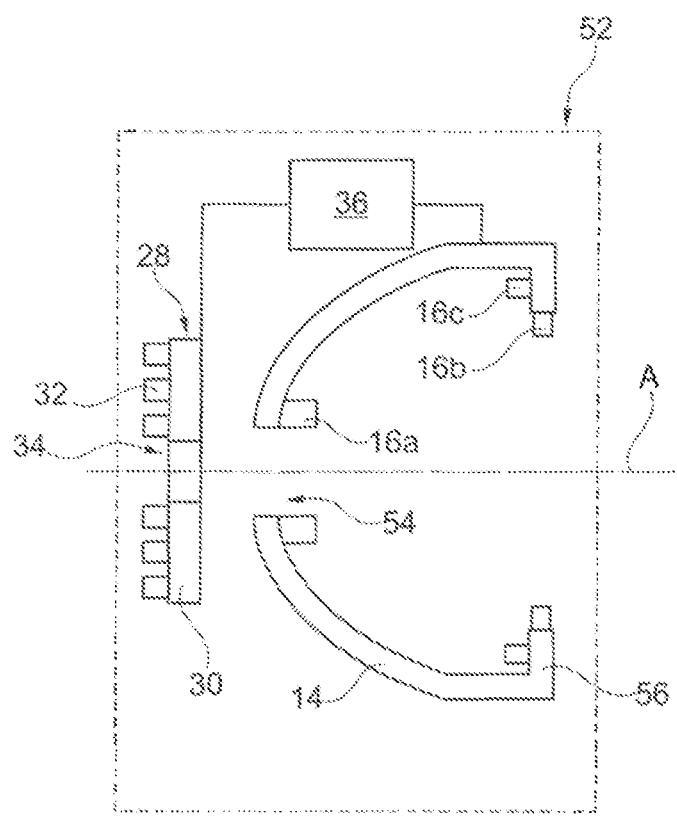
FIG. 6 schematically shows a variant lighting device for a machine-vision device.

FIG. 6 illustrates a variant lighting device 52. The latter differs from the lighting device 12 of FIGS. 3 and 4 essentially in that it includes a single light-source holder 14 of hemispherical shape. An aperture 54, which is preferably circular, is provided in the holder 14 at its apex, so as to be placed facing the aperture 34 of the sensor holder 30 of the interface 28. The apertures 34 and 54 are coaxial, and of axis A.

Automatically controlled light sources 16a are preferably placed in a ring around the aperture 54 of the holder 14. Furthermore, automatically controlled light sources 16b and 16c are preferably placed in a ring on the base 56 of the holder 14. Automatically controlled light sources 16b may be oriented radially toward the axis A of the hemispherical holder, parallel to the axis A (16c) and/or toward the apex of the holder 14. A hemispherical holder 14 generally allows more uniform illumination of the zones of interest of a machine-vision device than is possible with a lighting device the holder 14 of which is planar.

Figure 7:
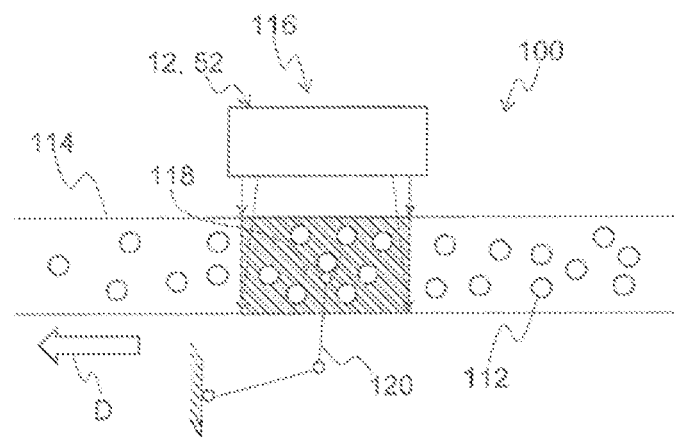
FIG. 7 schematically shows a device for conveying items.

FIG. 7 schematically illustrates a device 100 for conveying industrial items 112. This conveying device 100 comprises a conveying track 114 that conveys the items 112 in the direction D. The conveying track 114 is for example a conveyor belt. The conveying device 100 comprises a machine-vision device 116, the lighting device 12, 52 of which may in particular be such as described above with reference to FIGS. 1 to 6. The lighting device 12, 52 illuminates a zone of interest 118 formed by a section of the conveying track 114, through which the items 112 pass.

The machine-vision device is known per se. It may in particular include a board (also known as a frame grabber) for interfacing between a computer and the camera in order to digitize the images if the camera is not suitable for digitizing the captured images directly. The camera may be directly connected to a communication bus (TCP-IP, USB, IEEE-1394 etc.). A processing unit, often a microcomputer or a system with an integrated processor (such as a DSP), makes it possible to determine, using image-processing software, items present in the captured image that do not correspond to the sorting criteria. A synchronizing sensor, which is often optical or magnetic, or encoders, may also be provided, in order to trigger the camera when an item passes into its field of view. A system of digital inputs/outputs, or a "standard" communication system, for example a network connection or an RS-232 connection or most often an RS-485 connection for long distances, may be provided in order to transmit the data between the various elements of the machine-vision device.

The conveying device 100 further comprises a sorting unit 120 for removing from the conveying track 114 the selected items 112, for example items the inspection of which by the machine-vision device has revealed a defect. In the present case, this sorting unit consists of a movable arm 120 for removing items 112 from the conveying track 114.

Figure 8:
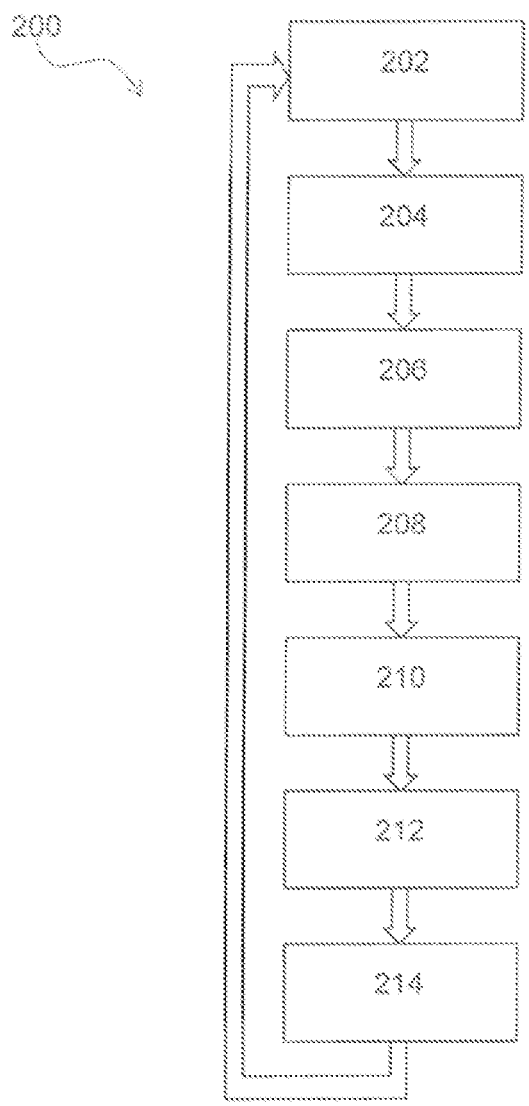
FIG. 8 shows a flowchart of an example of a method for conveying items.

FIG. 8 illustrates an industrial conveying method 200 able to be implemented, for example, in an industrial conveying device such as illustrated in FIG. 7.

In this conveying method 200, a step 202 of conveying items to a zone of interest 118 is first carried out.

Origin light signals $S_{26}$ are emitted, in a step 204, by origin light sources 26 of the camera system 18.

These origin light signals are captured, in a step 206, by the light sensors 32 of the interface 28.

In the following step 208, the signals emitted by the light sensors 32 in response to the reception of these origin light signals $S_{26}$ are processed in order to deduce therefrom control signals $S_{36}$ for one or more automatically controlled light sources 16 of the lighting device 12. This control is carried out according to a protocol, depending on the emitted color and on the position of the one or more origin light sources 26 in question.

For example, a camera comprising 4 groups of integrated multi-colored LEDs able to emit red, green or blue light allows at least $2^3 \times 2^4 = 8 \times 16 = 128$ different illuminations to be produced.

It is thus possible to drive, using the interface according to the invention placed in front of a camera 18 comprising such integrated lights, at least 128 automatically controlled light sources, or at least 128 combinations of sectors and of different colors. The automatically controlled light sources preferably belong to an external set of lights (i.e. a set of lights not included in the camera system 18). It is thus possible to produce complex lighting sequences as though the automatically controlled light sources were driven directly by the software of the camera system 18.

In the step 210, the zone of interest 118 is illuminated by the lighting device 12, 52 in the way deduced in step 208.

Figure 9:
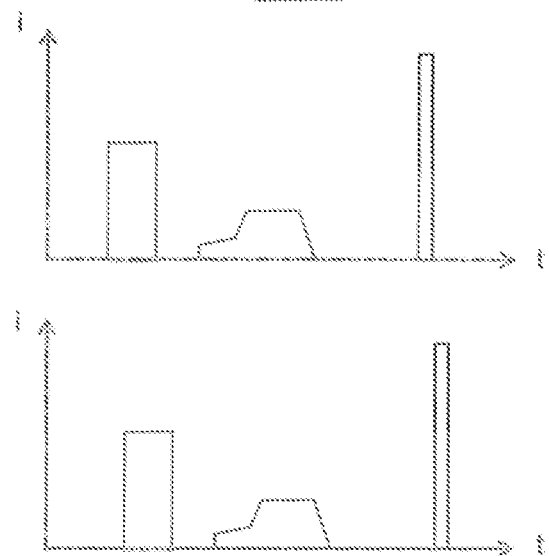
FIG. 9 schematically shows timing diagrams showing the intensity i of the light emitted by an origin light source (top graph) and by the corresponding automatically controlled light source (bottom graph), as a function of time t.

As shown in FIG. 9, in one embodiment the timing diagram of the power of the light emitted by one origin light source 26 (top graph) is used to control an automatically controlled light source 16 so that it emits with the same timing diagram (bottom graph). The temporal offset between the two curves may be smaller than 50 μs, preferably smaller than 10 μs, and preferably smaller than 5 μs.

Next there follows a step 212 of capturing an image of the zone of interest 118 with the camera system 18, this image then being interpreted, in a way known per se, in order to deduce therefrom information on the conveyed items passing through the zone of interest 118. Items that do not meet a defined criterion may then be removed (sorting step 214).

The method 200 may then be reiterated.

As should be clear by now, the invention provides a simple and flexible solution allowing lighting to be optimally adapted.

The invention is not limited to only the examples that were described above and those skilled in the art will be able to envision many variants thereof.

Thus, the camera system used may include one or more digital or analog, monochrome or color, cameras equipped with an objective suitable for the conditions of the image capture, in particular for the distance and size of the zone to be imaged and/or for the conveyed items to be identified in this image.

The applications are not limited to an industrial conveying device.

The invention claimed is:

1. A machine-vision device comprising:
   a camera system comprising a camera and at least one origin light source that is integrated into the camera system; and
   a lighting device comprising:
      a control interface comprising:
         a plurality of light sensors each for capturing a respective origin light signal, and emitting a respective sensor signal in response to the capture of said respective origin light signal;
         an electronic unit for processing said respective sensor signal, configured so as to transmit, as a consequence of said processing, a respective control signal to at least one respective output of the processing electronic unit,
      one or more automatically controlled light sources that are external to said camera system, each connected to one respective output of the processing electronic unit by respective connecting means, so as to be controlled with the control signal delivered to said output,
   at least one light sensor being placed so as to directly capture the light emitted by one origin light source,
   wherein the light sensors are configured to detect only a light spectrum of a width smaller than 100 nm.

2. The machine-vision device as claimed in claim 1, wherein the electronic unit is configured so as to identify an automatically controlled light source to be controlled with said control signal and so as to generate said control signal depending on a light intensity and/or a color to be emitted by said automatically controlled light source.

3. The machine-vision device as claimed in claim 2, wherein the electronic unit is configured so that the magnitude of said control signal is proportional to the intensity of said origin light signal.

4. The machine-vision device as claimed in claim 1, wherein the electronic unit is configured so as to drive the automatically controlled light sources depending on the timing of the sensor signals received by the electronic unit, and/or on the origin of the sensor signals received by the electronic unit, and/or on the color of the origin light signals received by said sensors.

5. The machine-vision device as claimed in claim 1, wherein the light sensors are distributed over a sensor holder having a sensor-holder aperture of radius larger than 12 mm and smaller than 30 mm.

6. The machine-vision device as claimed in claim 1, wherein the one or more automatically controlled light sources are each a light-emitting diode or a group of light-emitting diodes.

7. The machine-vision device as claimed in claim 1, wherein the automatically controlled light sources are fastened to an automatically-controlled-light-source holder that is equipped with an automatically-controlled-light-source-holder aperture, and the light sensors are fastened to a sensor holder having a sensor-holder aperture that is coaxial with said automatically-controlled-light-source-holder aperture.

8. The machine-vision device as claimed in claim 1, wherein the one or more automatically controlled light sources are configured to emit flashes of a duration shorter than 10 ms and/or a light spectrum of a width smaller than 100 nm.

9. The machine-vision device as claimed in claim 1, wherein the electronic unit is configured so as to drive the automatically controlled light sources depending on the timing of the sensor signals received by the electronic unit, and/or on the origin of the sensor signals received by the electronic unit, and/or on the color of the origin light signals received by said light sensors.

10. The machine-vision device as claimed in claim 1, wherein the light sensors are fastened to a sensor holder with a density of at least one light sensor per 9 mm$^2$ and of at most one light sensor per mm$^2$.

11. The machine-vision device as claimed in claim 1, wherein each light sensor is placed so as to directly capture the light emitted by a single respective origin light source or by a single group of origin light sources that emit synchronously.

12. The machine-vision device as claimed in claim 1, wherein the camera system is independent of the lighting device.

13. The machine-vision device as claimed in claim 1, including a plurality of light sensors and a plurality of origin light sources, the light sensors being oriented toward the origin light sources.

14. The machine-vision device as claimed in claim 1, wherein the light sensors are provided only facing origin light sources.

15. A device for conveying items, comprising at least:
an item-conveying track, and
a machine-vision device as claimed in any one of the preceding claims, the automatically controlled light sources being suitable for illuminating at least one segment of the item-conveying track.

16. The machine-vision as claimed in claim 1, wherein said light spectrum is centered on a discrete wavelength chosen among 470 nm, 525 nm, 635 nm, 660 nm, 850 nm and 880 nm.

17. The machine-vision as claimed in claim 1, wherein at least one output is an electrical terminal and the means of connection are electric cables.

18. The machine-vision as claimed in claim 1, wherein at least one of said light sensors is configured so as to detect only a light spectrum of a width smaller than 50 nm.

19. A method for controlling lighting for a machine-vision device, comprising the steps of:
  i) emitting origin light signals;
  ii) capturing the emitted origin light signals;
  iii) processing the captured origin light signals in order to deduce therefrom the way in which to control one or more automatically controlled light sources;
  iv) controlling one or more automatically controlled light sources in the way deduced in step iii).

20. A method as claimed in claim 19, wherein said method comprises the following steps:
  a) determine a light intensity and/or a color for the light to be produced;
  b) identify one or several automatically controlled light sources to command, depending on its or their position and/or on the captured origin light signals in order to obtain the light intensity and/or color for the light to be produced;
  c) command one or several automatically controlled light sources, depending on its or theirs position and/or on the captured origin light signals in order to obtain the light intensity and/or color for the light to be produced.

21. A method as claimed in claim 19, wherein said method comprises the step of commanding a respective automatically controlled light source depending on a respective light signal from a respective origin light source received by a respective sensor.

* * * * *